United States Patent
Kawano

(10) Patent No.: US 12,277,631 B2
(45) Date of Patent: Apr. 15, 2025

(54) ENLARGING A MASK IMAGE FROM A SIZE CORRESPONDING TO A REDUCED IMAGE USING INTERPOLATION METHODS

(71) Applicant: CANON KABUSHIKI KAISHA, Tokyo (JP)

(72) Inventor: Ruriko Kawano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 17/865,510

(22) Filed: Jul. 15, 2022

(65) Prior Publication Data
US 2023/0040912 A1 Feb. 9, 2023

(30) Foreign Application Priority Data
Aug. 3, 2021 (JP) ................. 2021-127735

(51) Int. Cl.
*G06T 11/40* (2006.01)
*G06T 3/4007* (2024.01)
*H04N 1/387* (2006.01)

(52) U.S. Cl.
CPC ........... *G06T 11/40* (2013.01); *G06T 3/4007* (2013.01); *H04N 1/3875* (2013.01); *G06T 2200/24* (2013.01)

(58) Field of Classification Search
None
See application file for complete search history.

(56) References Cited

U.S. PATENT DOCUMENTS

| 5,331,427 A * | 7/1994 | Namizuka ................ H04N 1/41 358/426.03 |
| 6,118,457 A * | 9/2000 | Ohtsuka ................ G06T 3/4007 345/620 |
| 10,291,824 B2 | 5/2019 | Yamamoto et al. |
| 11,244,186 B2 | 2/2022 | Horiike et al. |

(Continued)

FOREIGN PATENT DOCUMENTS

| JP | 2008-262567 A | 10/2008 |
| JP | 2009152779 A * | 7/2009 |

(Continued)

OTHER PUBLICATIONS

Tomii Hiromi, "Imaging Apparatus, and Program for Imparting Image Effect" (translation), Jul. 9, 2009, European Patent Register, pp. 1-9 (Year: 2009).*

(Continued)

*Primary Examiner* — Kent W Chang
*Assistant Examiner* — Jonathan M Cofino
(74) *Attorney, Agent, or Firm* — Venable LLP

(57) ABSTRACT

An information processing system is provided. A first generation unit generates a reduced image in which an original image is reduced. A display control unit causes a display unit of a predetermined apparatus to display the reduced image. A second generation unit generates, based on an input to the predetermined apparatus of a user, a mask image to be overlapped on the reduced image displayed on the display unit. An enlargement unit enlarges the mask image by using a different interpolation method in a case where the mask image has a predetermined property and in a case where the mask image does not have the predetermined property.

13 Claims, 16 Drawing Sheets

(56) References Cited

U.S. PATENT DOCUMENTS

| | | | |
|---|---|---|---|
| 2004/0036687 A1* | 2/2004 | Nakamura | G06T 3/4007 345/422 |
| 2008/0043264 A1* | 2/2008 | Gil | H04N 1/62 358/1.9 |
| 2008/0158386 A1* | 7/2008 | Miki | H04N 23/6845 348/E5.007 |
| 2008/0260282 A1* | 10/2008 | Hasegawa | G06T 5/92 382/260 |
| 2012/0102621 A1* | 5/2012 | Rodriguez | A41G 7/00 2/206 |
| 2016/0364839 A1* | 12/2016 | Duan | G06T 3/4007 |
| 2018/0270395 A1 | 9/2018 | Yamamoto et al. | |
| 2021/0014362 A1 | 1/2021 | Kawano | |
| 2021/0014363 A1 | 1/2021 | Kawano | |

FOREIGN PATENT DOCUMENTS

| | | |
|---|---|---|
| JP | 2009-284093 A | 12/2009 |
| JP | 2012-048756 A | 3/2012 |
| JP | 2019-017003 A | 1/2019 |

OTHER PUBLICATIONS

Feb. 21, 2025 Japanese Official Action in Japanese Patent Appl. No. 2021-127735.

* cited by examiner

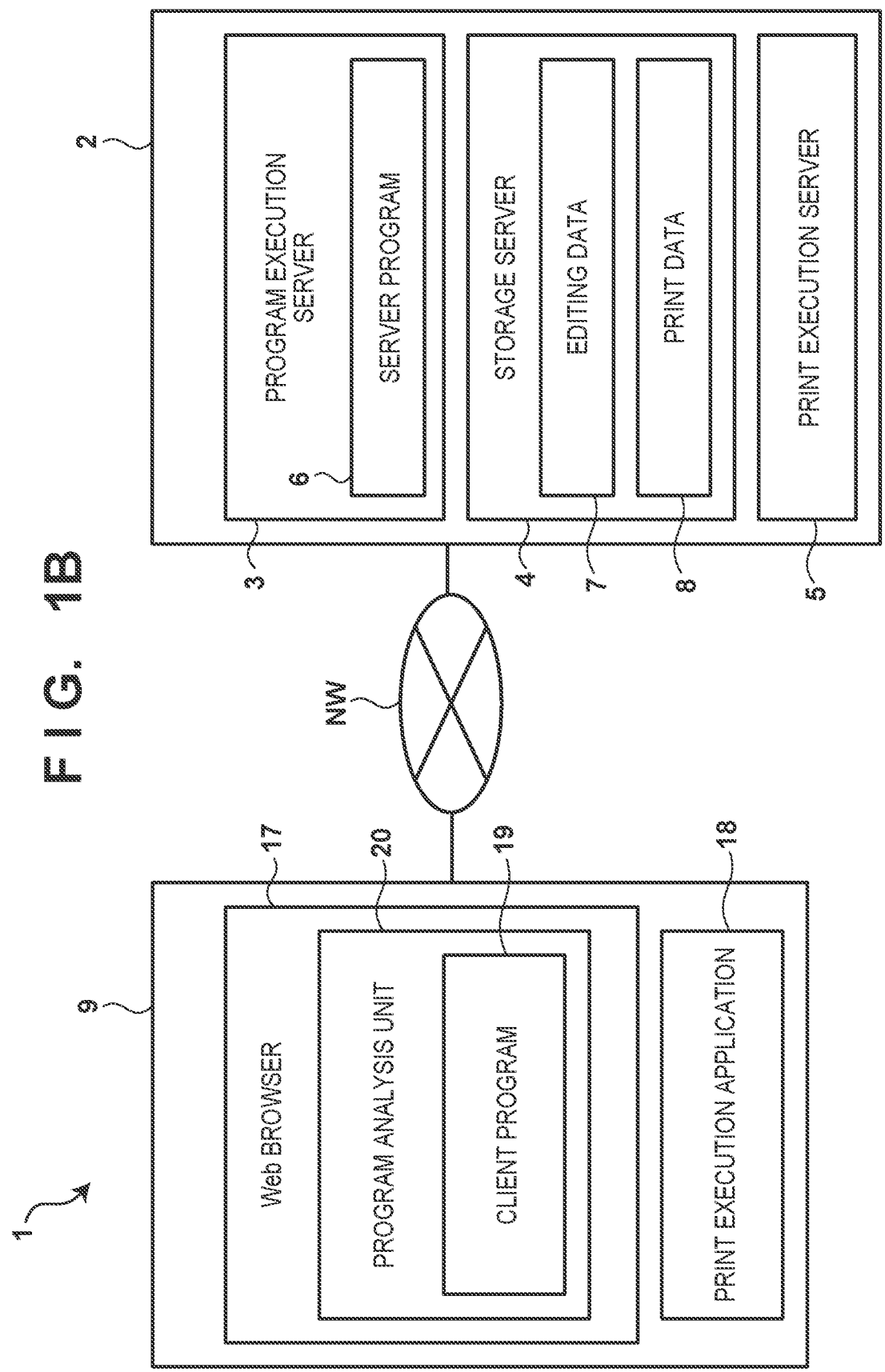

FIG. 6

| SPOT COLOR NAME | DISPLAY RGB |
|---|---|
| SPOT COLOR_1 | R=1 G=1 B=0 |
| SPOT COLOR_2 | R=127 G=128 B=127 |
| SPOT COLOR_3 | R=191 G=192 B=191 |
| SPOT COLOR_4 | R=217 G=218 B=217 |
| SPOT COLOR_5 | R=248 G=249 B=248 |

901

SPOT COLOR MASK IMAGE

902

REGULAR COLOR MASK IMAGE

TEXT MASK IMAGE

RANGE MASK IMAGE

ENLARGING A MASK IMAGE FROM A SIZE CORRESPONDING TO A REDUCED IMAGE USING INTERPOLATION METHODS

BACKGROUND OF THE INVENTION

Field of the Invention

The present invention relates to an information processing system, a server, and an information processing method.

Description of the Related Art

There are cases in which images may be used for editing posters, albums, or the like. In this case, an edit operation (hereinafter referred to as a "fill") may be performed to fill a part of an image with an arbitrary color for the purpose of partially correcting color or hiding information that should not be seen. In a document management image editing system described in Japanese Patent Laid-Open No. 2008-262567, in a case where a fill is performed at an arbitrary location in an image in an image editing system, it is possible to select whether or not to make mask information fixed when image data is written externally. As a result, concealing an arbitrary part of an image file and distributing it externally is realized.

SUMMARY OF THE INVENTION

According to an embodiment of the present invention, there is provided an information processing system, comprising: a first generation unit configured to generate a reduced image in which an original image is reduced; a display control unit configured to cause a display unit of a predetermined apparatus to display the reduced image; a second generation unit configured to generate, based on an input to the predetermined apparatus of a user, a mask image to be overlapped on the reduced image displayed on the display unit; and an enlargement unit configured to enlarge the mask image by using a different interpolation method in a case where the mask image has a predetermined property and in a case where the mask image does not have the predetermined property.

According to another embodiment of the present invention, there is provided a server, comprising: an acquiring unit configured to acquire an original image, a reduced image in which the original image has been reduced, and a mask image of a size corresponding to the reduced image; and an enlargement unit configured to enlarge the mask image by using a different interpolation method in a case where the mask image has a predetermined property and in a case where the mask image does not have the predetermined property.

According to still another embodiment of the present invention, there is provided an information processing method, comprising: generating a reduced image in which an original image is reduced; causing a display unit of a predetermined apparatus to display the reduced image; generating, based on an input to the predetermined apparatus of a user, a mask image to be overlapped on the reduced image displayed on the display unit; and enlarging the mask image by using a different interpolation method in a case where the mask image has a predetermined property and in a case where the mask image does not have the predetermined property.

Further features of the present invention will become apparent from the following description of exemplary embodiments (with reference to the attached drawings).

BRIEF DESCRIPTION OF THE DRAWINGS

FIG. 1B is a software configuration diagram of the information processing system.

FIG. 6 is a view illustrating a relationship between types of spot colors available for fill and RGB values when displayed on screen.

DESCRIPTION OF THE EMBODIMENTS

Generally, in image editing by using a Web application or the like, operation speed is improved by displaying a reduced image (thumbnail) in which an original image is reduced for display rather than displaying the original image to be edited as it is. In such a case, when outputting a fill result, it is necessary to enlarge a mask image from a size corresponding to the reduced image to a size corresponding to the original image, and then combine it with the original image. In the enlargement of the mask image, a known interpolation method such as a nearest neighbor method or a bilinear method may be used, for example, but depending on the properties of the mask image, the enlarged mask image may not conform to the user's intention.

Embodiments of the present invention provide techniques for enlarging a mask image in a more appropriate manner.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw-

First Embodiment

<System Configuration>

Figure 1A:
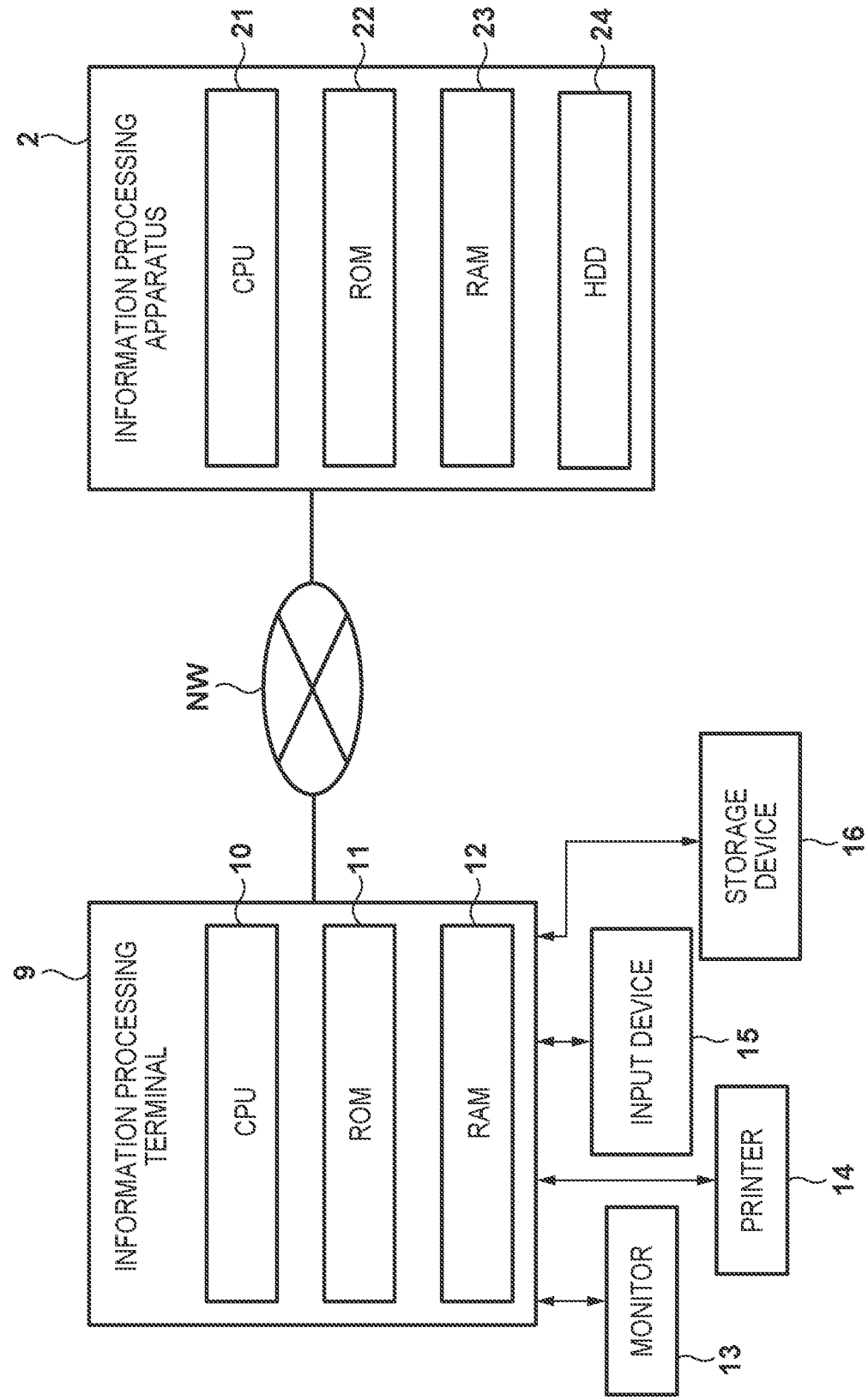
FIG. 1A is a hardware configuration diagram of an information processing system according to the present embodiment.

FIG. 1A is a hardware configuration diagram of an information processing system 1 according to the present embodiment. FIG. 1B is a software configuration diagram of the information processing system 1. The information processing system 1 is a system for a user to edit an image in order to create a poster, an album, or the like. The information processing system 1 includes an information processing apparatus 2 and an information processing terminal 9. The information processing apparatus 2 and the information processing terminal 9 are configured to be able to communicate via a network NW such as the Internet.

The information processing apparatus 2 is a system that executes processing as a server for a Web application. The information processing apparatus 2 includes a CPU 21, a ROM 22, a RAM 23, and an HDD 24. The CPU 21 is a central processing unit and controls the entire information processing apparatus 2 by executing a program stored in the ROM 22, the RAM 23, or the like. The ROM 22 is a read-only memory that stores various programs. The RAM 23 is a random access memory, and although it is used as a work memory of the CPU 21, it can also store each program if it is a non-volatile RAM. The HDD 24 is a hard disk drive that stores an operating system, system software, application software, image data, setting data, and the like. Also, other storage devices, such as SDDs, may also be provided.

In this embodiment, the CPU 21 functions as a server system which includes each server shown in FIG. 1B by reading a program stored in the ROM 22 or the HDD 24 to the RAM 23 and executing the program. Although one information processing apparatus 2 is shown here, a plurality of information processing apparatuses may be used to realize respective server functions. For example, an information processing apparatus comprising a program execution server 3, an information processing apparatus comprising a storage server 4, and an information processing apparatus comprising a print execution server 5 may be provided, respectively. For example, one server may be configured by a plurality of information processing apparatuses.

The program execution server 3 executes a server program 6 that is a program that operates in the information processing apparatus 2. The server program 6 is stored and managed by the program execution server 3. Physically, the server program 6 is stored in the HDD 24 or the like of the information processing apparatus 2 that functions as the program execution server 3.

The storage server 4 stores and manages various types of data used in the Web application. The storage server 4 saves editing data 7 such as image data of an image used for editing and print data 8 for printing a resulting document after editing. Physically, these data are stored in the HDD 24 or the like of the information processing apparatus 2 that functions as the storage server 4.

The print execution server 5 performs processing for printing the edited resulting document. For example, when a print instruction is received from a user, the print execution server 5 transmits the print data 8 stored in the storage server 4 to the print execution application 18 which is described later.

The information processing apparatus 2 includes a communication interface (not shown) for communicating with an external device (the information processing terminal 9, for example) through a network NW such as the Internet.

The information processing terminal 9 is an information processing terminal for a user to perform editing of an image by a Web application. The information processing terminal 9 may be a terminal device such as a general personal computer, a smart phone, or a tablet. The information processing terminal 9 includes a CPU 10, a ROM 11, and a RAM 12. The information processing terminal 9 is connected to a monitor 13 for displaying various kinds of information, a printer 14 for printing the print data 8, an input device 15 for receiving input by a user, and a storage device 16 for storing various data and programs. Note, these input/output devices may be provided as devices separate from the information processing terminal 9, or at least some of the devices may be included in the information processing terminal 9.

The CPU 10 is a central processing unit and controls the entire information processing terminal 9 by executing an OS (operating system) stored in the storage device 16, the ROM 11, the RAM 12, or the like. The CPU 10 also executes a Web browser 17, a print execution application 18, or another program stored in the ROM 11, the RAM 12, or the like. The CPU 10 performs an operation based on the input data, processes the data, and outputs the data, and controls the respective hardware to realize the respective functions of the information processing terminal 9. The ROM 11 is a read-only memory that stores each program. The RAM 12 is a random-access memory, and although it is used as a work memory of the CPU 10, it can also store programs if it is a non-volatile RAM. In this embodiment, the CPU 10 functions as the software shown in FIG. 1B by reading a program stored in the ROM 11 to the RAM 12 and executing the program.

The Web browser 17 is software for browsing Web sites on the Internet and executing Web applications. When executing a Web application, the Web browser 17 receives a client program 19 from the information processing apparatus 2 which is the server system. The Web browser 17 executes the received client program by a program analysis unit 20 that interprets HTML and a script language such as JavaScript. The print execution application 18 acquires the print data 8 from the storage server 4, transmits the print data 8 to the printer 14, and causes the printer 14 to perform printing. In the present embodiment, the programs of the web browser 17 and the print execution application 18 are assumed to be stored in the ROM 11, but as described above, the programs may be stored in the RAM 12 or the storage device 16.

The information processing terminal 9 includes a communication interface (not shown) for communicating with an external device (the information processing apparatus 2, for example) through a network NW such as the Internet. The information processing terminal 9 includes an interface (not shown) for connecting to the monitor 13, the printer 14, the input device 15, the storage device 16, and the like.

<Web Application Screen Example>

Figure 2:
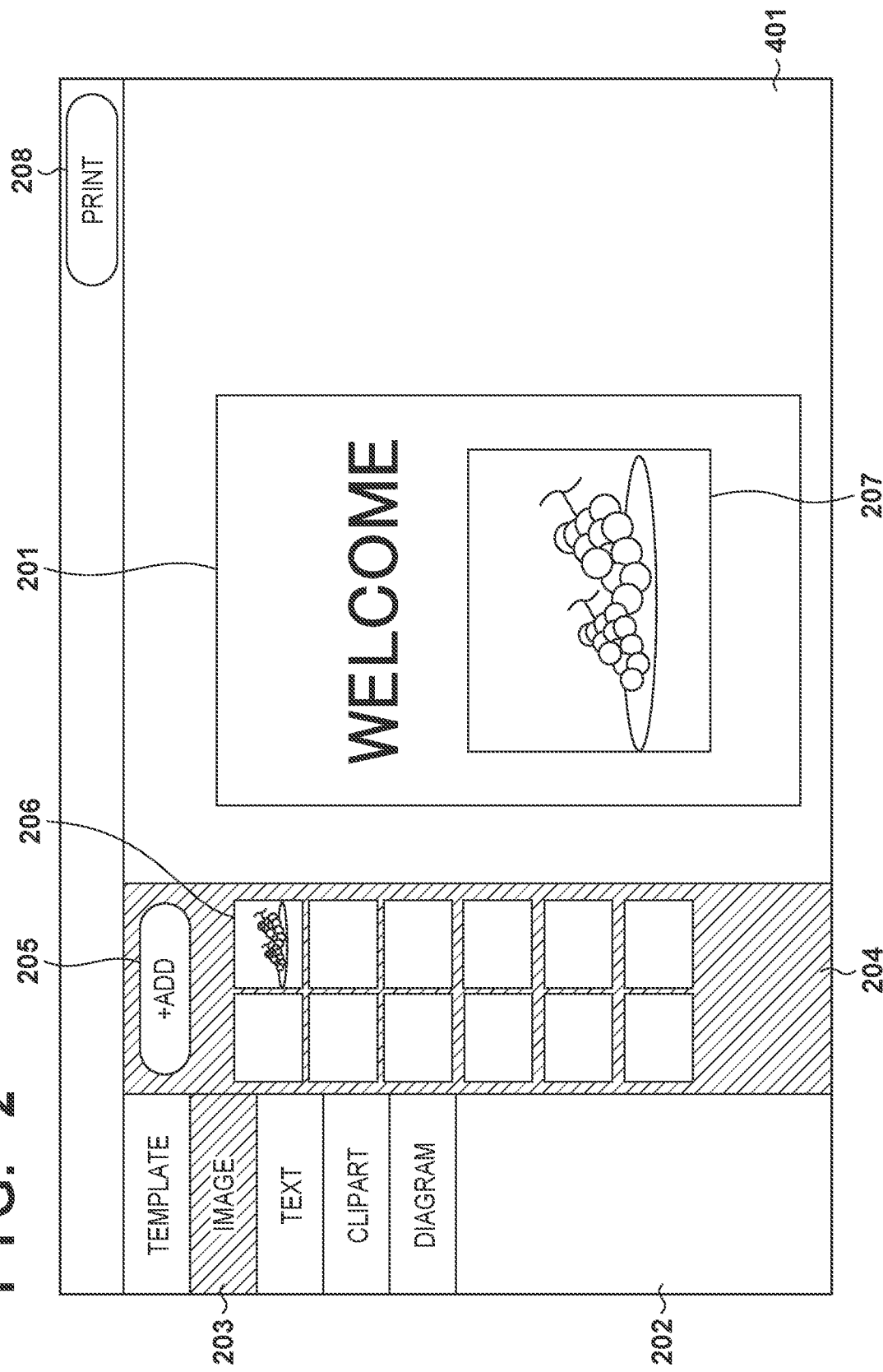
FIG. 2 is a view illustrating an example of a screen of a Web application.

FIG. 2 is a view illustrating an example of a screen of a Web application for performing poster editing that operates in the Web browser 17. This screen and the Web application screens referenced later in the description are displayed on the monitor 13 by, for example, display control of the monitor 13 (display unit) by the information processing apparatus 2. A poster 201 shows a preview of the poster currently being edited by the user.

An area 202 is an area for selecting the type of an object to be added to the poster 201. In this example, an "image" button 203 is in a selected state.

An area 204 is an area in which the contents of the object selected in area 202 are displayed. In this example, since the image button 203 is in the selected state, an image list added by the user is displayed in the area 204. The image group displayed in the area 204 is not necessarily limited to the user's images, and, for example, template images held by the Web application and the like may be displayed.

A button 205 is a button for adding an image to area 204. When the button 205 is selected, the information processing terminal 9 can display a dialog for selecting an image stored in the user terminal and can accept a selection of an arbitrary image by the user. Alternatively, when the button 205 is selected, the information processing terminal 9 may acquire an image from a cloud or an image provisioning service. The image added by the button 205 is added to and displayed in the image group within the area 204 in a thumbnail size (see FIG. 3).

A thumbnail 207 is an image arranged within the poster 201. This is added by a drag operation from the thumbnail 206 which is one of the images of the image group in the area 204.

A button 208 is a button for printing the poster 201. When the button 208 is pressed, the information processing terminal 9 installs or starts the print execution application 18 and causes the printer 14 to execute printing.

<Flow of Thumbnail Creation>

Figure 3:
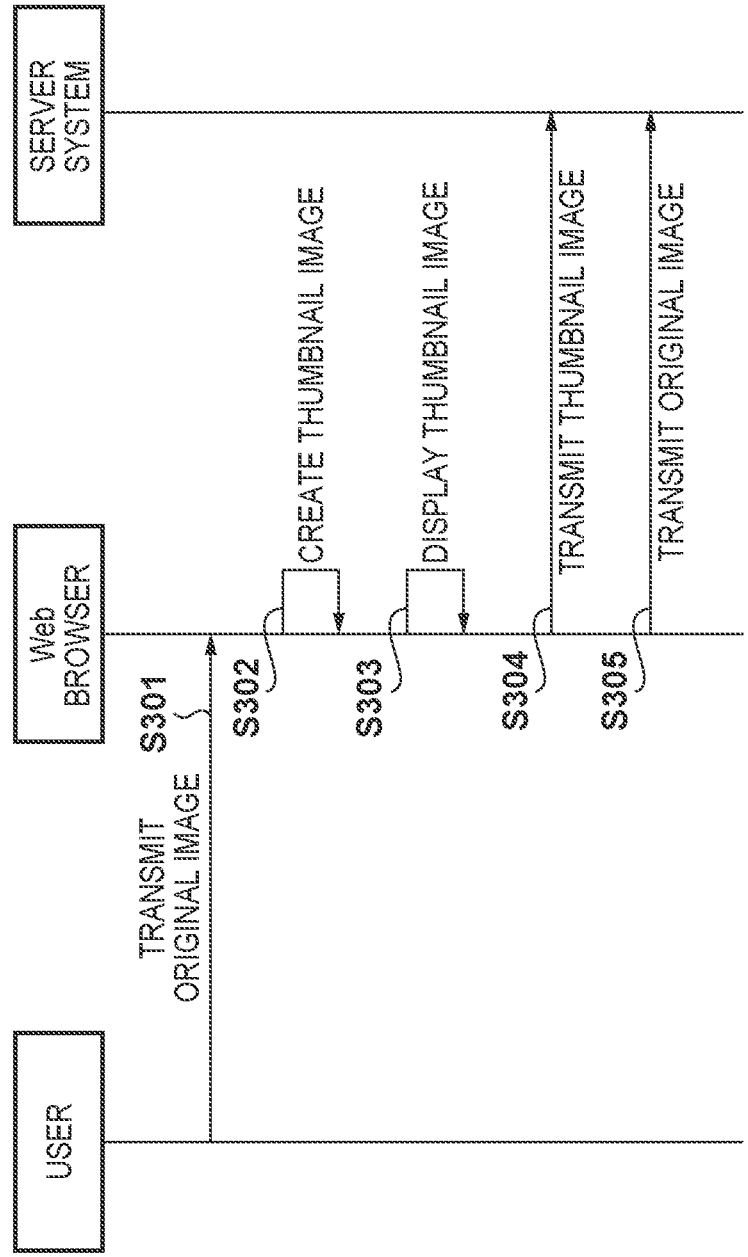
FIG. 3 is a view illustrating one example of a flow in which a thumbnail is created and displayed.

FIG. 3 illustrates an example of a flow in which the information processing terminal 9 creates and displays a thumbnail on a Web browser, such as the thumbnail 206, after the user adds an image with the button 205.

In step S301, when the user selects the button 205 and selects the image (original image) to be used for editing from the opened dialog, the Web browser 17 receives the selected original image.

In step S302, the Web browser 17 generates a thumbnail (reduced image) in which the original image accepted in step S301 is reduced for display in the Web application. In step S303, the web browser 17 displays the thumbnail 204 generated in step S302.

In step S304, the Web browser 17 transmits the original image received in step S301 to the information processing apparatus 2. In step S305, the web browser 17 transmits the thumbnail generated in step S302 to the server.

<Fill Processing>

Figure 4:
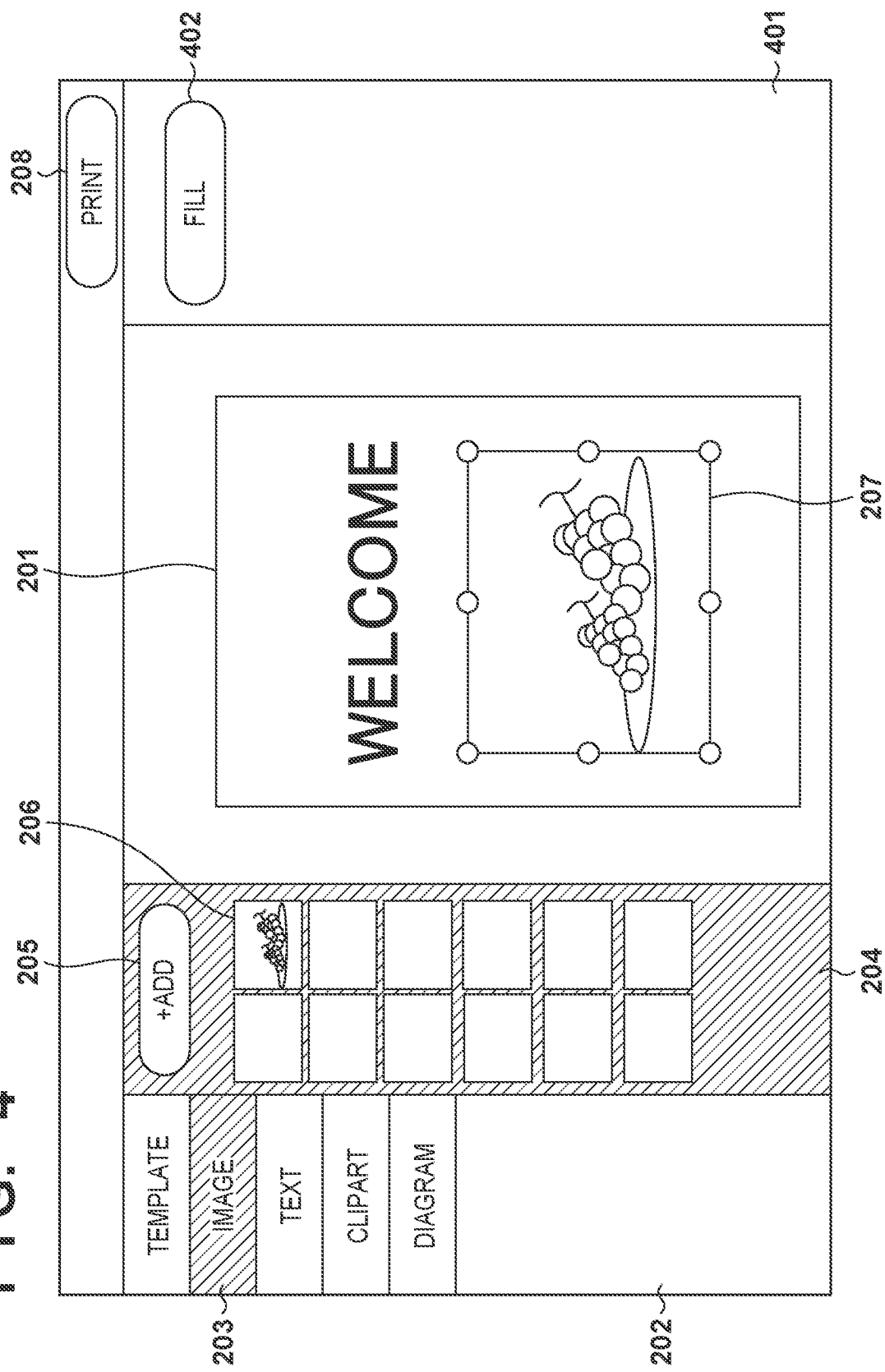
FIG. 4 is a view illustrating an example of a screen of a Web application.

Next, fill processing, which is an example of an image editing operation that can be performed by the Web application, is described. FIG. 4 shows a screen displayed on the Web browser 17 when the user selects the thumbnail 207 on the screen shown in FIG. 2. A menu for editing the thumbnail 207 is displayed in an area 401. A button 402 is a button for performing an editing operation for filling a portion of the thumbnail 207 with an arbitrary color.

Figure 5:
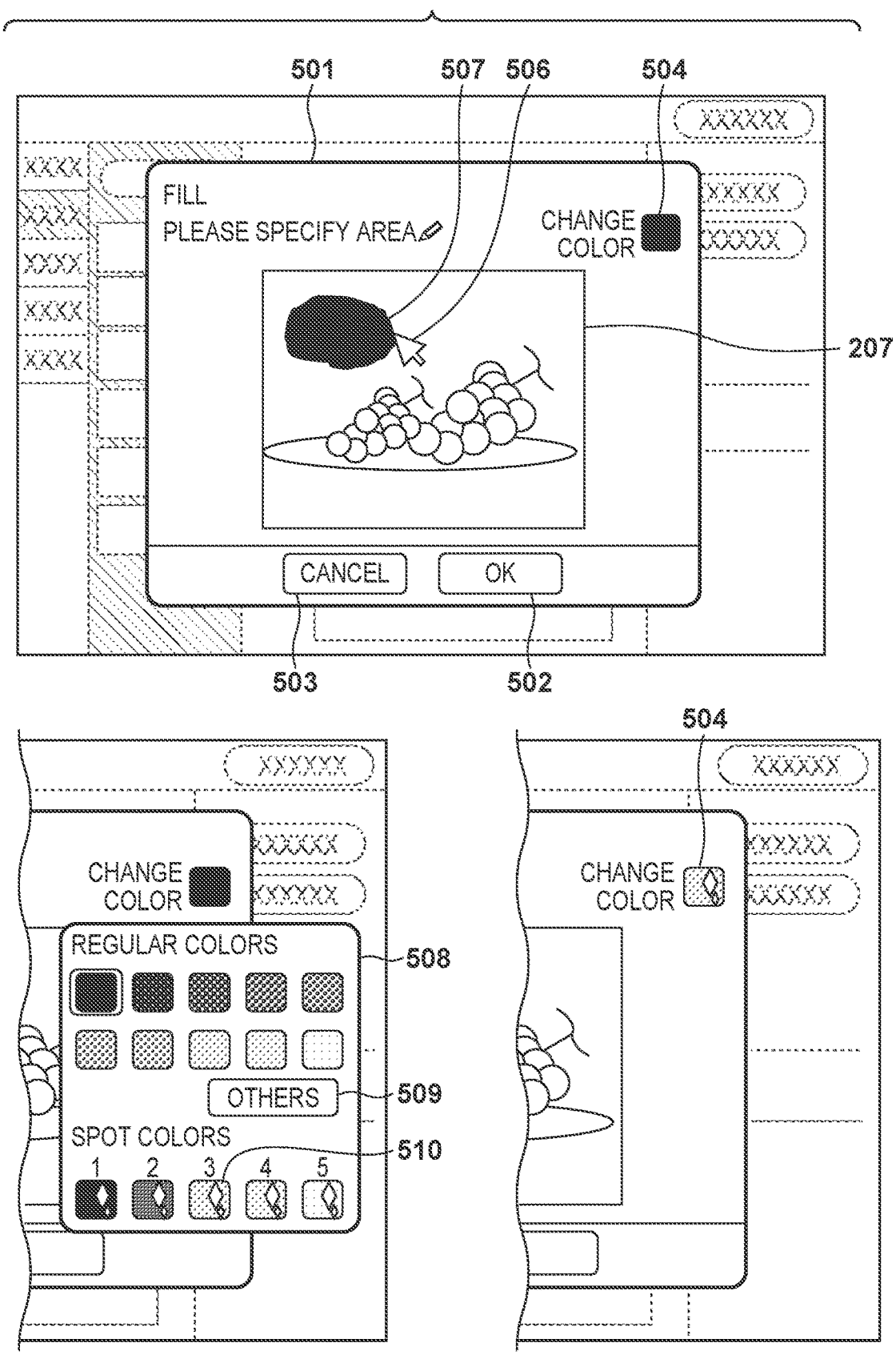
FIG. 5 is a view illustrating an example of a screen of a Web application.

FIG. 5 shows a screen displayed on the Web browser 17 when the user selects the button 402 shown in FIG. 4. A fill dialog 501 is a UI (user interface) for performing a fill. A button 502 is a button for reflecting the result of the fill to the thumbnail 207. A button 503 is a button for cancelling the editing operation of the fill. A color display button 504 is a button for displaying the color to be filled and changing the color to be filled.

The thumbnail 207 is the thumbnail which is to be edited and which has been selected in FIG. 4. The user can specify a fill area 507 by a drag operation or the like in which a cursor 506 is moved onto the thumbnail 207 by an input device 15 such as a pointing device. The specified fill area 507 is filled with the color displayed on the color display button 504 and is displayed over the thumbnail 207.

The user selects the color display button 504 to change the fill color. When the color display button 504 is selected, a popup 508 is displayed. The user can change the color of the fill by selecting any of the colors displayed in the popup 508. In this example, a state is shown in which the display of the color display button 504 is changed to a spot color by selecting a button 510.

In the present embodiment, regular colors and spot colors are displayed in a list in the popup 508 as colors that can be selected as the fill color. In the present embodiment, it is assumed that the printer 14 is a printing apparatus capable of printing by using spot color ink.

Spot color ink is ink that expresses a spot color; for example, it is an ink that expresses a color when printed that cannot be expressed in the SRGB color space. In other words, the printer 14 is configured to enable spot color printing, which is printing using a spot color ink which is different from regular inks.

"Regular ink" is ink for printing a process color (regular color), and is ink of colors such as cyan (C), magenta (M), yellow (Y), and black (K), which are the basic process colors. Note, the process color is a color to be expressed by one color of CMYK or a combination of two or more colors of CMYK. In addition, in this embodiment, a fluorescent pink ink or a fluorescent orange ink is used as a spot color ink. That is, the spot color is a color that is not a process color and cannot be expressed by only one color of CMYK or combinations of two or more colors of CMYK. However, the present invention is not limited to this form, and the quantity and color(s) of the spot color ink is arbitrary, and an ink of a color that is not a fluorescent color may be used. For example, an ink such as violet ink, green ink, orange ink, gold ink, and silver ink may be used as the spot color. Also, other metallic color inks may be used. Further, a blended ink in which a spot color ink and another ink (e.g., a regular ink) may be handled as a spot color ink. In addition, in the present embodiment, objects printed with a spot color have information (called spot color information) associated with them indicating that they are printed with a spot color. Also, a pixel to which spot color information is added is printed according to the spot color corresponding to the RGB value of that pixel. Note that the RGB value of a pixel corresponding to a spot color can also be used as the RGB value of a pixel corresponding to a color to be expressed only by a regular ink (that is, a regular color). In other words, an RGB value that is the same as the RGB value of a pixel corresponding to a spot color may be set to a pixel corresponding to a color that is to be expressed by regular ink alone. In this case, whether or not the special ink is to be used for printing the pixel of the RGB value is controlled according to whether or not the special color information is added.

FIG. 6 is a view illustrating a relationship between types of spot colors available for fill and the RGB values when displayed on screen. In a case where a spot color in the popup 508 is selected, the color represented by the corresponding RGB values in the table of FIG. 6 is filled in. For example, in a case where the button 510 is selected in FIG. 5, the color represented by R=191, G=192, B=191 becomes the fill color since the spot color_3 of FIG. 6 corresponds to this.

Figure 7:
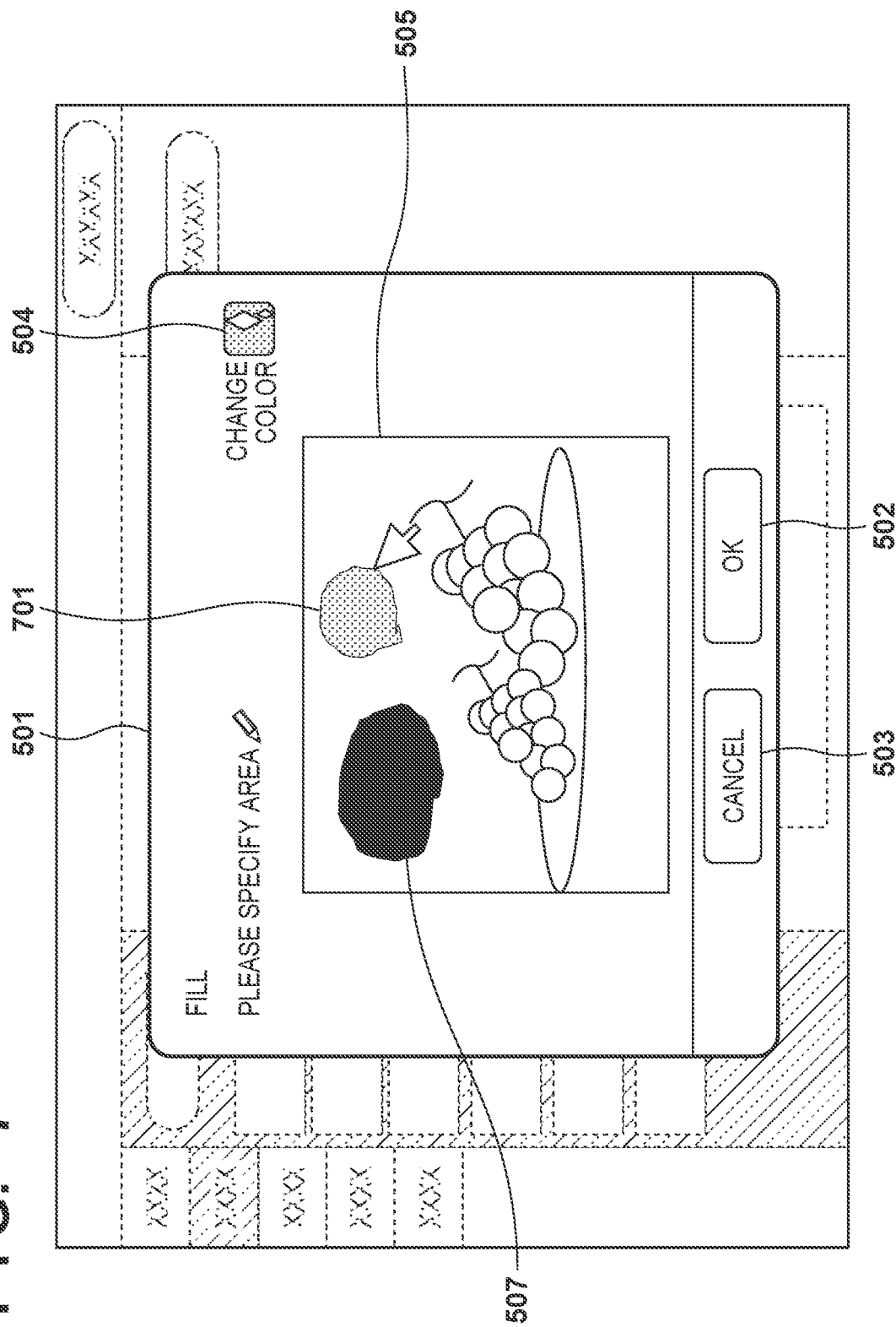
FIG. 7 is a view illustrating an example of a screen of a Web application.

FIG. 7 is a view illustrating an example of a screen of the Web application, and shows a state in which a fill has been performed with a spot color. A fill area 701 is an area that the user filled with spot color_3. In a case where the user selects the button 502 in this state, the edited thumbnail is reflected in the poster 201.

Figure 8:
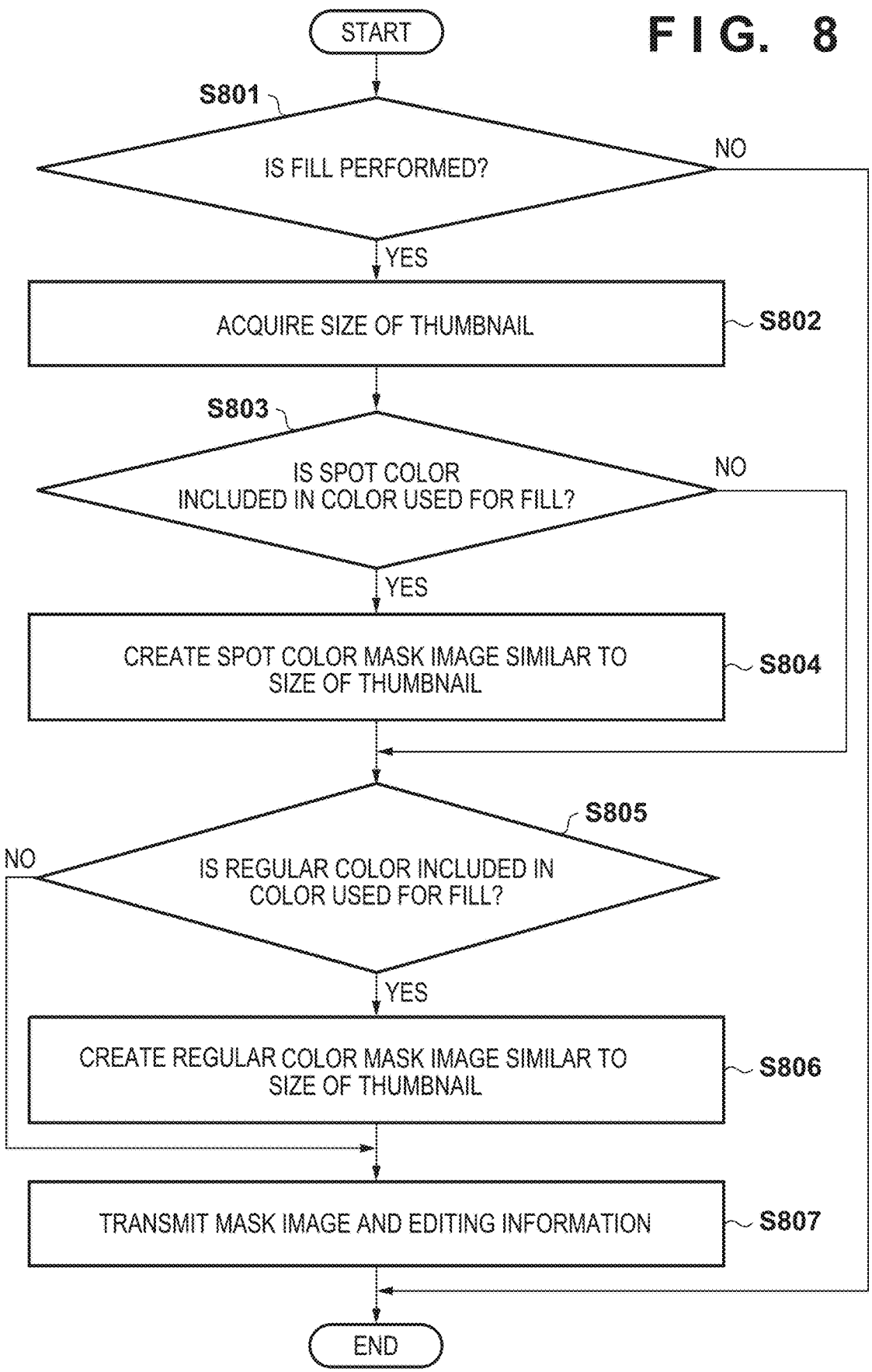
FIG. 8 is a flowchart illustrating an example of processing that the information processing terminal executes.

FIG. 8 is a flowchart illustrating an example of a process that the CPU 10 executes. This flowchart is started when the button 502 shown in FIG. 7 is selected and the fill dialog 501 is closed, for example. Note, each process in this flowchart is realized, for example, by the CPU 10 reading and executing the client program 19.

In step S801, the CPU 10 determines whether or not a fill has been performed. The CPU 10 advances the processing to step S802 in a case where a fill has been performed, and ends the flowchart when a fill has not been performed. For example, in a case where the button 502 has been selected in the state of FIG. 7, the CPU 10 determines that a fill has been performed and advances the processing to step S802 because the fill areas 507 and 701 are specified in the fill dialog 501.

In step S802, the CPU 10 acquires the size of the thumbnail 207 in order to determine the size when a mask image is created. Note that in the present embodiment, the mask image is an image to be printed so as to overlap on top of the original image selected and inputted by the user. Therefore, the mask image may be an area for printing the original image overlapping below the mask image, where no color is specified or an area for printing the mask image without printing the original image overlapping below the mask image, where a color is specified. For example, an area where the color is not specified is set to R=0, G=0, B=0 as the RGB value, and an area where the color is specified is set to the RGB value corresponding to the specified color. Note, a filled area which will be described later is a area where the color is specified.

In step S803, the CPU 10 determines whether or not a spot color is used in the fill. The CPU 10 advances the processing to step S804 in a case where it determines that a spot color is used for the fill; otherwise the CPU 10 advances the processing to step S805. For example, the CPU 10 acquires the RGB value of the color used for the fill and compares it with the value of the display RGBs of FIG. 6 to make a determination. More specifically, the CPU 10 may determine that a spot color is used for the fill in a case where the RGB value of the color used for the fill matches the RGB value of any of the spot color_1 to the spot color_6. In a case where the button 502 is selected in the state of FIG. 7, the CPU 10 advances the processing to step S804 because a spot color is used for a fill whose area is specified by the fill area 701.

Figure 9A:
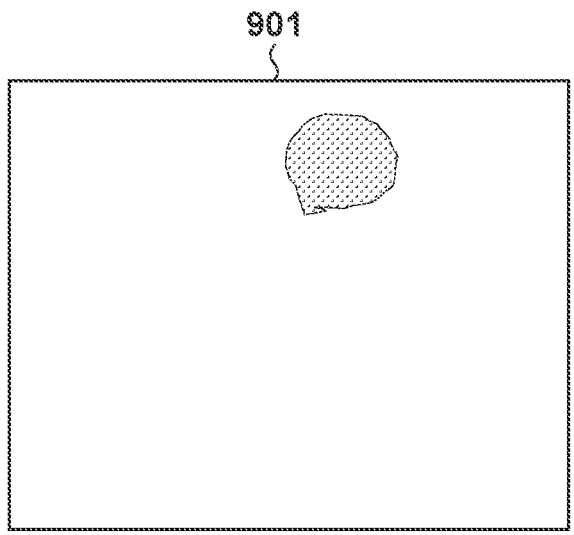
FIG. 9A is a view exemplifying a mask image.

In step S804, the CPU 10 creates a fill mask image of only the spot color corresponding to the size of the thumbnail 207 acquired in step S802. FIG. 9A shows a mask image 901 created based on the fill of the spot color specified by the fill area 701 shown in FIG. 7.

In step S805, the CPU 10 determines whether or not a regular color is used in the fill. The CPU 10 advances the processing to step S806 in a case where it determines that a regular color is used for the fill, otherwise the CPU 10 advances the processing to step S807. For example, the CPU 10 acquires the RGB value of the color used for the fill and compares it with the value of the display RGBs of FIG. 6 to make a determination. More specifically, the CPU 10 may determine that a regular color is used for the fill in a case where the RGB value of the color used for the fill does not match the RGB values of the spot color_1 to spot color_6. In a case where the button 502 is selected in the state of FIG. 7, the CPU 10 advances the processing to step S806 because the regular color is used for a fill whose area is specified by the fill area 507.

Figure 9B:
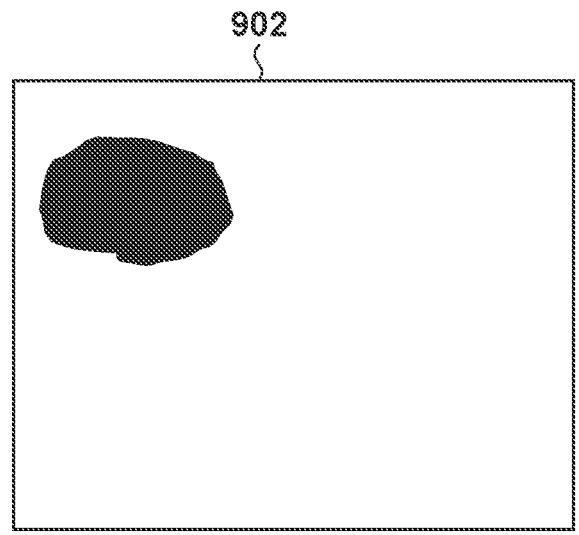
FIG. 9B is a view exemplifying a mask image.

In step S806, the CPU 10 creates a fill mask image of only the regular color corresponding to the size of the thumbnail 207 acquired in step S802. FIG. 9B shows an image 902 created based on the fill of the regular color specified by the fill area 507 shown in FIG. 7.

In step S807, the CPU 10 transmits the mask images 901 and 902 or other editing information created in step S804 and step S806 as editing data 7 to the information processing apparatus 2. The information processing apparatus 2 stores the received information as editing data 7 to the storage server 4.

Thus, based on the input to the information processing apparatus 2 of the user, a mask image 901 is generated to be overlapped on the thumbnail 207 displayed on the monitor 13.

Figure 10:
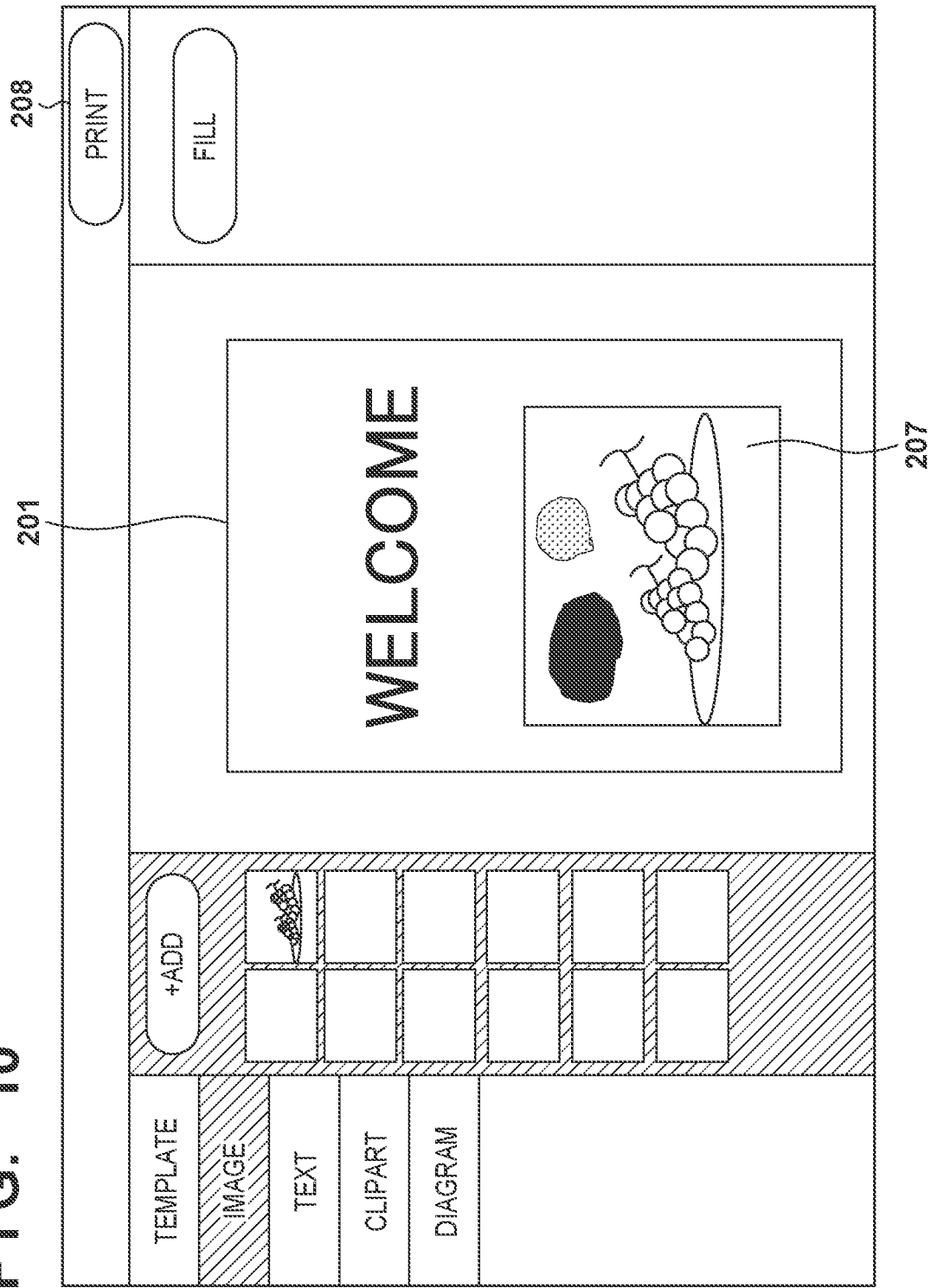
FIG. 10 is a view illustrating an example of a screen of a Web application.

FIG. 10 shows a screen after the button 502 is selected in FIG. 7. Here, the result of the fill is reflected on the thumbnail 207. In the present embodiment, the CPU 10 can generate a mask image in which a regular color is filled and a mask image in which a spot color is filled, such that they coexist. When the user selects the button 208 in this state, the program execution server 3 creates the print data 8 of the poster 201 reflecting the fill.

Figure 11:
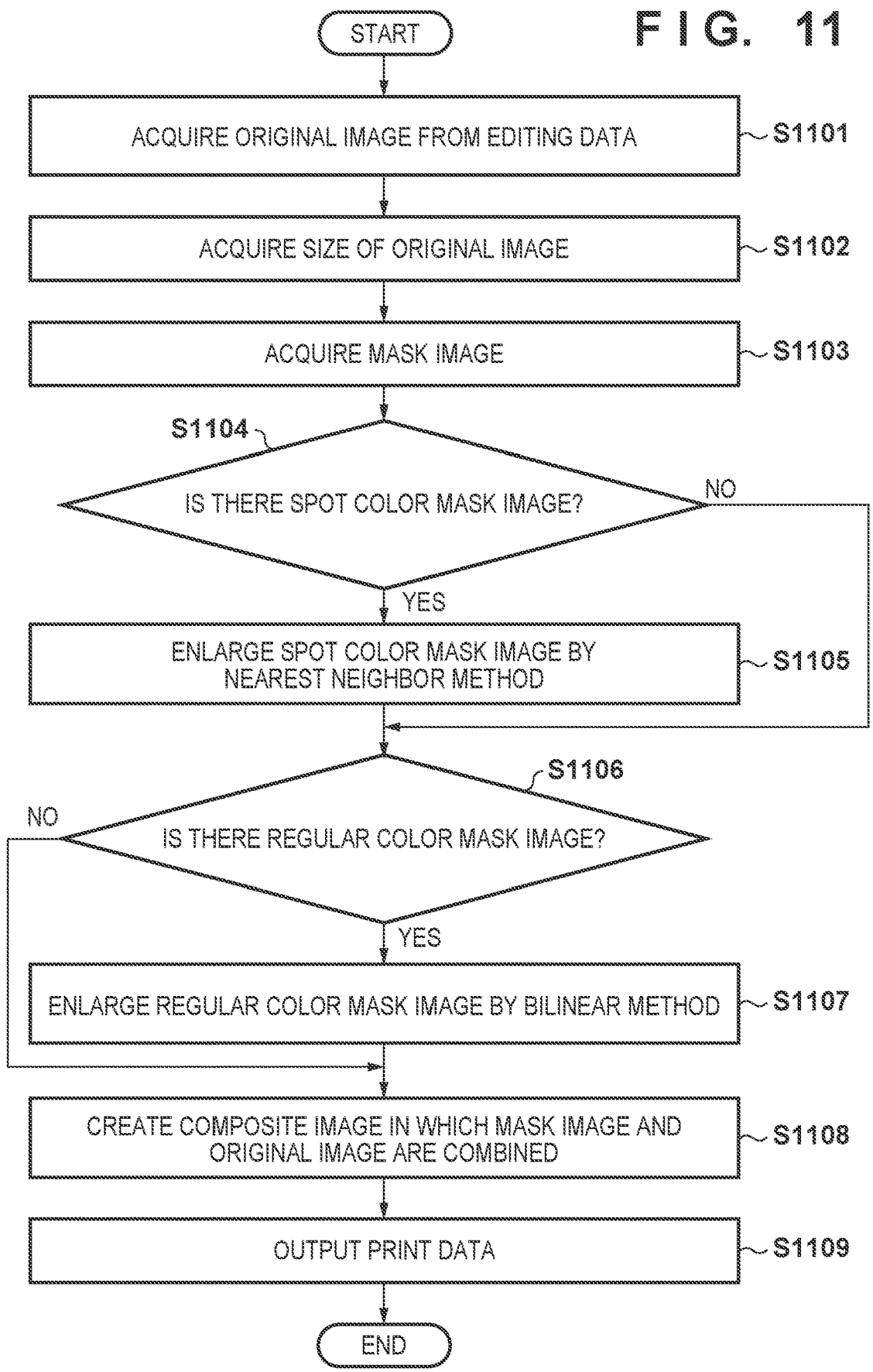
FIG. 11 is a flowchart illustrating an example of processing that an information processing apparatus executes.

FIG. 11 is a flowchart illustrating an example of processing that the CPU 21 of the information processing apparatus 2 executes. This flowchart mainly shows processing when the program execution server 3 creates a composite image reflecting a fill result on the original image in order to create the print data 8. Note, processing in this flowchart is realized, for example, by the CPU 21 reading the server program 6 into the RAM 23 and executing the program.

In step S1101, the CPU 21 acquires the original image from the editing data 7 stored in step S305 of FIG. 3.

In step S1102, the CPU 21 acquires the size of the original image acquired in step S1101. In step S1103, the CPU 21 acquires the mask image stored in the editing data 7 in step S807.

In step S1104, the CPU 21 determines whether or not a mask image of a spot color is included in the mask image acquired in step S1103. The information processing apparatus 2 advances the processing to step S1105 in a case where a mask image of a spot color is included, and advances the processing to step S1106 if not. For example, the information processing apparatus 2 may determine whether or not a mask image of a spot color is included by a method similar to the method performed by the CPU 10 in step S803 of FIG. 8. Alternatively, when the CPU 10 transmits the editing data 7 to the information processing apparatus 2 in step S807, information indicating whether the mask image is a spot color or a regular color may be transmitted in association with the mask image. Then, the information processing apparatus 2 may make a determination based on the associated information.

This conditional branch is to determine whether or not the mask image has a predetermined property. In the present embodiment, it can be said that the predetermined property is a property related to the color of the mask image, and the CPU 21 determines that the mask image has the predetermined property in a case where a color to be expressed by a spot color ink is used in the mask image. Furthermore, in a case of a similar method to that of the method performed by the CPU 10 in step S803 of FIG. 8, it can be said that the CPU 21 determines that the mask image has a predetermined property in a case where the color of the mask image expressed by an RGB value cannot be reproduced by a CMYK value.

In step S1105, the CPU 21 enlarges the mask image of the spot color with the nearest neighbor method. Here, the information processing apparatus 2 enlarges the mask image of the spot color to a size corresponding to the size of the original image acquired in step S1102. In other words, the information processing apparatus 2 enlarges the mask image of a spot color by the same magnification as that of the original image with respect to the thumbnail.

Here, the CPU 21 interpolates a pixel to be interpolated by using the nearest neighbor method which interpolates based on one pixel value of the periphery. Interpolation by a bilinear method, a bi-cubic method, or the like, which is described later, can also be considered. However, when interpolating by these methods in the enlargement of the mask image of a spot color, the pixel value of an area not filled with the spot color may be referenced when interpolating near the boundary of a filled area. As a result, there is a possibility that a color other than the spot color, that is, a color which cannot be reproduced by the spot color ink at the time of printing will be included in the mask image after enlargement. Therefore, in the present embodiment, in the enlargement of the mask image of a spot color, interpolation is performed using the nearest neighbor method which interpolates based on one pixel value of the periphery, allowing the mask image after enlargement to be represented by only a spot color.

In step S1106, the CPU 21 determines whether or not a mask image of a regular color is included in the mask image acquired in step S1103. The information processing apparatus 2 advances the processing to step S1107 in a case where a mask image of a regular color is included, and advances the processing to step S1108 if not. For example, the information processing apparatus 2 may determine whether or not a mask image of a regular color is saved by a method similar to the method performed by the CPU 10 in step S805 of FIG. 8.

In step S1107, the CPU 21 enlarges a mask image of the regular color with the bilinear method. Here, the information processing apparatus 2 enlarges the mask image of the regular color to a size corresponding to the size of the original image acquired in step S1102. In other words, the information processing apparatus 2 enlarges the mask image of the regular color by the same magnification as that of the original image with respect to the thumbnail.

Here, the CPU 21 interpolates a pixel to be interpolated by using the bilinear method which interpolates based on a plurality pixel values of the periphery. For a mask image of a regular color, there is no concern about the color of the pixel to be interpolated at the time of enlargement, as there is with a mask image of a spot color. Therefore, by using the bilinear method, the mask image after enlargement can be done better than the case of using the nearest neighbor method. Note that the present invention is not limited to the bilinear method, and other methods such as the bi-cubic method in which interpolation is performed based on a plurality of peripheral pixel values can be employed.

In step S1108, the CPU 21 generates a composite image in which an original image and mask images of a size corresponding to the original image and generated in step S1105 and step S1107 are combined. That is, the composite image is an image reflecting the fill editing operation shown in FIG. 7 and the like. In step S1109, the CPU 21 outputs the print data of the poster 201 including the generated composite image to the information processing terminal 9.

As described above, in the present embodiment, the mask image is enlarged by using different interpolation in a case where the mask image is a spot color and a case where it is not (step S1105 and step S1107). By enlarging the mask image by a method that matches the characteristics of the fill color ink, a reduction in the quality of the fill mask image can be suppressed. That is, in the present embodiment, the mask image can be enlarged by using an appropriate interpolation method in accordance with the properties of the mask image.

Second Embodiment

In the first embodiment, the interpolation method at the time of enlargement of the mask image is changed according to the color of the mask image, which is an example of a property of the mask image. In the second embodiment, the interpolation method at the time of enlargement of the mask image is changed according to an object of the mask image, which is an example of a property of the mask image. Although the second embodiment is described below, the same components as those of the first embodiment are given by the same reference numerals and descriptions thereof are omitted.

Figure 12:
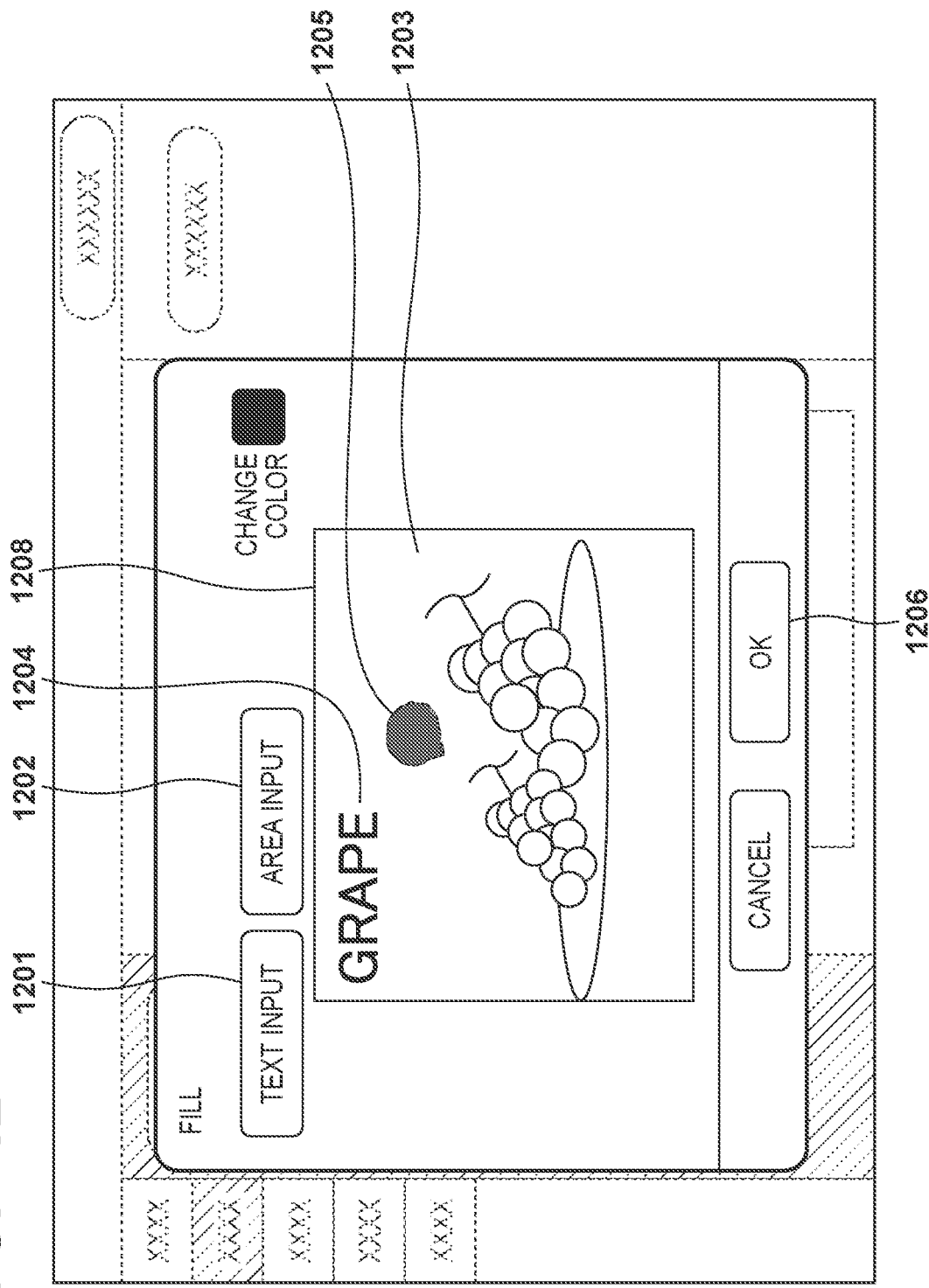
FIG. 12 is a view illustrating an example of a screen of a Web application.

FIG. 12 is a view showing an example of a screen when the button 402 of FIG. 4 is selected. In the present embodiment, a fill dialog 1208 is configured to allow selection of a fill by text input and a fill by area input.

A button 1201 is a button for inputting text on a thumbnail 1203. For example, configuration may be taken such that, when the button 1201 is selected, a text box is displayed on the thumbnail 1203 to allow text input by the input device 15, such as a keyboard. FIG. 12 shows a text 1204 as an input result when the user selects the button 1201 and enters text.

A button 1202 is a button for inputting a fill area. For example, when the button 1202 is selected, a fill area can be selected by a drag operation or the like. FIG. 12 shows the fill area 1205 as an input result when the user selects the button 1202 to specify the fill area.

A button 1206 is a button for reflecting the result of the fill to the thumbnail 1203. When button 1206 is selected, the edited thumbnail is reflected within the poster 201.

Figure 13:
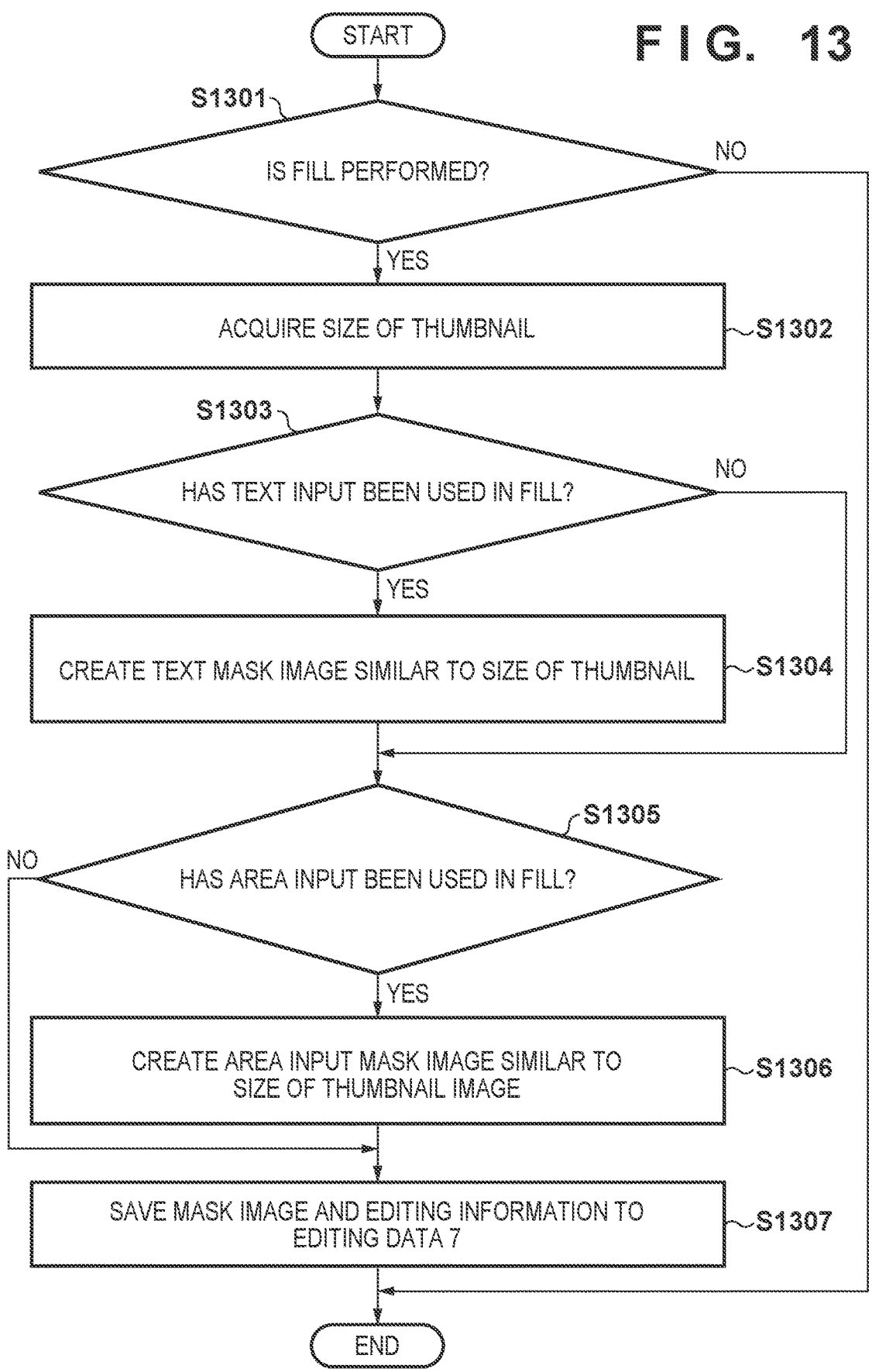
FIG. 13 is a flowchart illustrating an example of processing that the information processing terminal executes.

FIG. 13 is a flowchart illustrating an example of a process that the CPU 10 executes. This flowchart is started when the button 1206 shown in FIG. 12 is selected and the fill dialog 1208 is closed, for example. Note, each process in this flowchart is realized, for example, by the CPU 10 reading and executing the client program 19. Note that step S1301, step S1302, and step S1307 are the same steps as those of step S801, step S802, and step S807 of FIG. 8, respectively, and therefore descriptions thereof are omitted.

In step S1303, the CPU 10 determines whether or not a text input is used in the fill. The CPU 10 advances the processing to step S1304 in a case where a text input has been used in the fill, otherwise the CPU 10 advances the processing to step S1305.

Figure 14A:
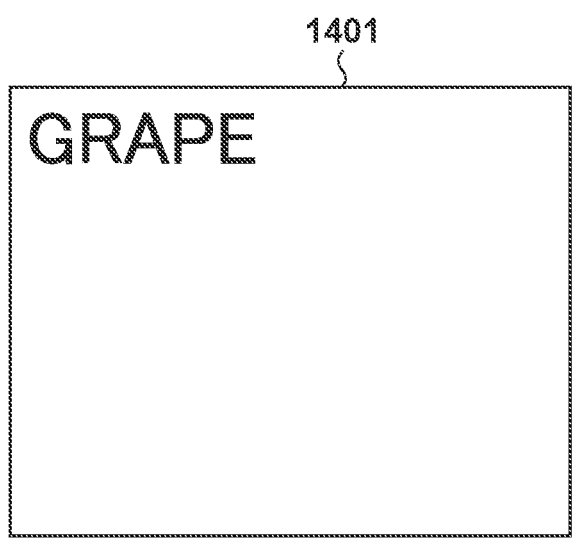
FIG. 14A is a view exemplifying a mask image.

In step S1304, the CPU 10 creates a text mask image corresponding to the size of the thumbnail 1207 acquired in step S1302. FIG. 14A shows a mask image 1401 created based on the text 1204 shown in FIG. 12.

In step S1305, the CPU 10 determines whether or not an area input is used in the fill. The CPU 10 advances the processing to step S1306 in a case where an area input is used for the fill, otherwise the CPU 10 advances the processing to step S1307.

Figure 14B:
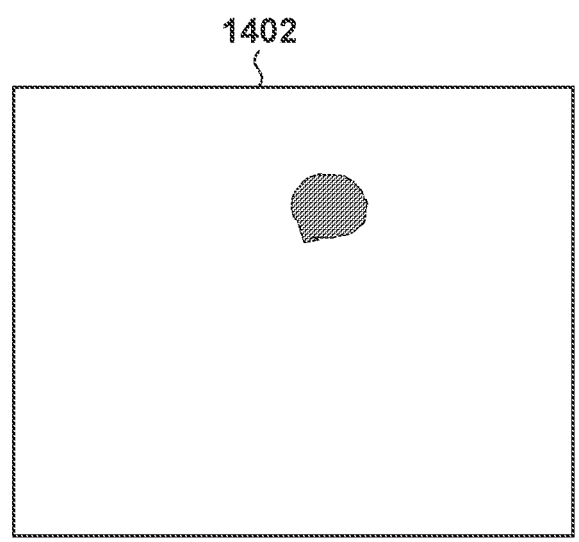
FIG. 14B is a view exemplifying a mask image.

In step S1306, the CPU 10 creates a mask image of a fill by an area input corresponding to the size of the thumbnail 1207 acquired in step S1302. FIG. 14B shows an image 1402 created based on the fill specified by the fill area 1205 shown in FIG. 12.

According to the flowchart of FIG. 13, a mask image based on text input and a mask image based on a fill area are created, respectively. In other words, a mask image is created for each object in the fill, respectively.

Figure 15:
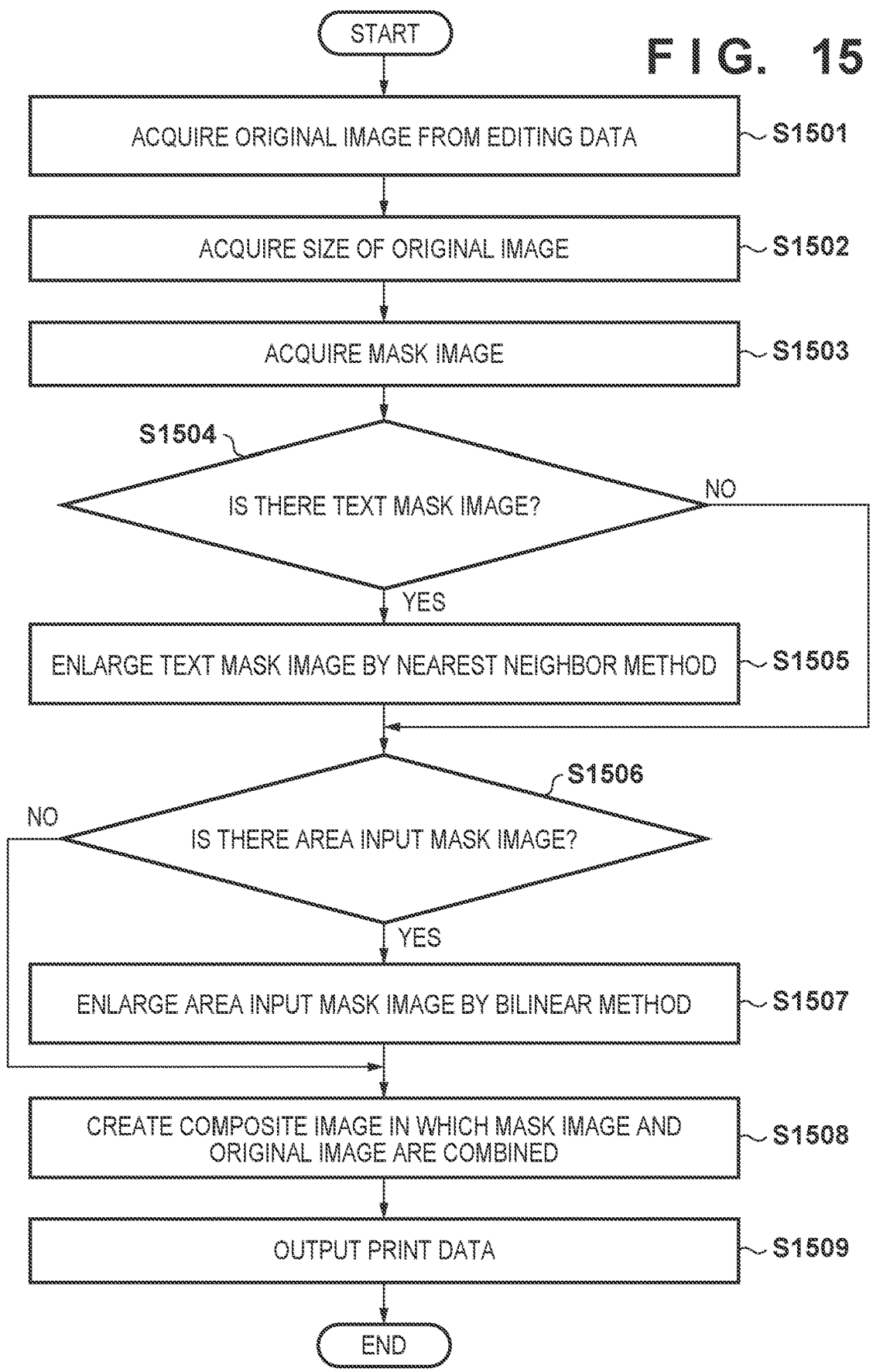
FIG. 15 is a flowchart illustrating an example of processing that an information processing apparatus executes.

FIG. 15 is a flowchart illustrating an example of processing that the information processing apparatus 2 executes. Specifically, this flowchart shows processing when the program execution server 3 creates a composite image reflecting the fill result on the original image in order to create the print data 8. Note, the processing of this flowchart is realized, for example, by the CPU 10 of the information processing apparatus 2 reading the server program 6 into the RAM 12 and executing the program. Note that step S1501 to step S1503 and step S1508 to step S1509 are the same steps as those of step S1101 to step 1103 and step S1108 to step S1109 of FIG. 11, respectively, and therefore descriptions thereof are omitted.

In step S1504, the CPU 21 determines whether or not a text mask image is included in the mask image acquired in step S1503. The information processing apparatus 2 advances the processing to step S1505 in a case where a mask image of a text is included, and advances the processing to step S1506 if not.

The conditional branch is to determine whether or not the mask image has a predetermined property. In the present embodiment, it can be said that the predetermined property is a property related to an object of the mask image, and the CPU 21 determines that the mask image has a predetermined property in a case where text is used in the mask image.

In step S1505, the CPU 21 enlarges the text mask image by the nearest neighbor method. More specifically, the information processing apparatus 2 enlarges the mask image of a text to a size corresponding to the size of the original image acquired in step S1502. In other words, the information processing apparatus 2 enlarges the text mask image by the same magnification as the magnification of the original image with respect to the thumbnail.

Here, the CPU 21 interpolates a pixel to be interpolated by using the nearest neighbor method which interpolates based on one pixel value of the periphery. In the case of a mask image of a text, in the case of a method of interpolation based on a plurality of pixel values in the periphery, such as the bilinear method, there is a possibility that the proximity of the contour will be blurred and that clear text cannot be output. Therefore, in the present embodiment, in enlarging the text mask image, the text can be clearly represented even after enlarging by interpolation using the nearest neighbor method.

In step S1506, the CPU 21 determines whether or not a mask image of an area input is included in the mask image acquired in step S1503. The information processing apparatus 2 advances the processing to step S1507 in a case where a mask image of an area input is included, and advances the processing to step S1508 if not.

In step S1507, the CPU 21 enlarges a mask image of an area input with the bilinear method. Specifically, the information processing apparatus 2 enlarges the mask image of an area input to a size corresponding to the size of the original image acquired in step S1502. In other words, the information processing apparatus 2 enlarges the mask image of an area input by the same magnification as the magnification of the original image with respect to the thumbnail.

As described above, in the present embodiment, the mask image is enlarged by using different interpolation in a case where the mask image is a text input and a case where it is not (step S1505 and step S1507). By enlarging the mask image by a method that matches the object of the fill, a reduction in the quality of the fill mask image can be suppressed. That is, in the present embodiment, the mask image can be enlarged by using an appropriate interpolation method in accordance with a property of the mask image.

<Variation>

In the above description of the embodiment, a general personal computer, a smart phone, a tablet, or other terminal device is exemplified as the information processing terminal 9, but the information processing terminal 9 may be an image processing device such as a printer, an Internet kiosk terminal, or the like.

In the above-described embodiment, the Web application is an application that performs poster creation, but the Web application may be another application that performs album creation, document creation, or the like. In addition, the configuration of the above-described embodiment can be applied not only to Web applications but also to applications composed of programs that can be directly executed on an operating system (OS) referred to as native applications. That is, the information processing system 1 is not limited to being configured by the information processing apparatus 2 and the information processing terminal 9, but may be configured by one or more of the information processing apparatus 2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-127735, filed Aug. 3, 2021, which is hereby incorporated by reference herein in its entirety.

What is claimed is:

1. An information processing system comprising:
   (a) at least one processor and (b) at least one memory coupled to the at least one processor and having instructions stored therein, the at least one processor and the at least one memory cooperating, when the instructions are executed by the at least one processor, to act as a plurality of units comprising:
   (1) a first generation unit configured to generate a reduced image in which an original image is reduced;
   (2) a display control unit configured to cause a display device of a predetermined apparatus to display the reduced image;
   (3) a second generation unit configured to generate, based on an input to the predetermined apparatus of a user, a mask image to be overlapped on the reduced image displayed on the display device; and
   (4) an enlargement unit configured to enlarge the mask image by using (a) a first interpolation method in a case where a color to be expressed by a spot color ink is used in the mask image and (b) a second interpolation, different from the first interpolation method, in a case where the color to be expressed by the spot color ink is not used in the mask image.

2. The information processing system according to claim 1, wherein the plurality of units further comprises a composition unit configured to generate a composite image in which the original image and the mask image enlarged by the enlargement unit are combined.

3. The information processing system according to claim 2, wherein the plurality of units further comprises an output unit configured to output print data in which the composite image generated by the composition unit is included.

4. The information processing system according to claim 1, wherein the plurality of units further comprises a determination unit configured to determine whether or not the color to be expressed by the spot color ink is used in the mask image.

5. The information processing system according to claim 4, wherein the determination unit determines that the color to be expressed by the spot color ink is used in the mask image in a case where a color of the mask image expressed by an RGB value cannot be reproduced by a CMYK value.

6. The information processing system according to claim 4, wherein the second generation unit can generate the mask image such that the mask image of a spot color and the mask image of a regular color coexist.

7. The information processing system according to claim 1, wherein the enlargement unit enlarges the mask image from a size corresponding to the reduced image to a size corresponding to the original image.

8. The information processing system according to claim 1, wherein the predetermined apparatus is an information processing terminal, and
   wherein the information processing terminal functions as the first generation unit, the display control unit, the second generation unit, and the enlargement unit.

9. The information processing system according to claim 1, wherein the enlargement unit (1) interpolates a pixel to be interpolated based on one pixel value of a periphery in a case where the color to be expressed by the spot color ink is used in the mask image, and (2) interpolates a pixel to be interpolated based on a plurality of pixel values of a periphery in a case where the color to be expressed by the spot color ink is not used in the mask image.

10. The information processing system according to claim 1, wherein the enlargement unit enlarges the mask image by using a nearest neighbor method as the interpolation method in a case where the color to be expressed by the spot color ink is used in the mask image.

11. The information processing system according to claim 1, wherein the enlargement unit enlarges the mask image by using at least one of a bilinear method or a bi-cubic method as the interpolation method in a case where the color to be expressed by the spot color ink is not used in the mask image.

12. A server comprising:
    at least one memory and at least one processor which function as a plurality of units comprising:
    (1) an acquiring unit configured to acquire an original image, a reduced image in which the original image has been reduced, and a mask image of a size corresponding to the reduced image; and
    (2) an enlargement unit configured to enlarge the mask image by using (a) a first interpolation method in a case where a color to be expressed by a spot color ink is used in the mask image and (b) a second interpolation method, different from the first interpolation method, in a case where the color to be expressed by the spot color ink is not used in the mask image.

13. An information processing method comprising:
    generating a reduced image in which an original image is reduced;
    causing a display device of a predetermined apparatus to display the reduced image;
    generating, based on an input to the predetermined apparatus of a user, a mask image to be overlapped on the reduced image displayed on the display device; and
    enlarging the mask image by using (a) a first interpolation method in a case where a color to be expressed by a spot color ink is used in the mask image and (b) a second interpolation method, different from the first interpolation method, in a case where the color to be expressed by a spot color ink is not used in the mask image.

* * * * *